Jan. 5, 1960 R. T. ERICKSON ET AL 2,919,987
METHOD OF COOLING FISH PREPARATORY TO CANNING
Filed Dec. 23, 1957

REGINALD T. ERICKSON
MAX LOEWE
INVENTORS.

BY Fulwider, Mattingly
and Huntley
ATTORNEYS.

United States Patent Office 2,919,987
Patented Jan. 5, 1960

2,919,987

METHOD OF COOLING FISH PREPARATORY TO CANNING

Reginald T. Erickson, San Juan Capistrano, and Max Loewe, Long Beach, Calif., assignors to Star-Kist Foods, Inc., Terminal Island, Calif., a corporation of California Application December 23, 1957, Serial No. 704,838

2 Claims. (Cl. 99—111)

The present invention relates generally to the fishing industry and more particularly to a novel and improved method of preparing fish for canning.

The method of the present invention was particularly developed for use in canning tuna and tuna-like fishes. Such fishes include albacore, bluefin, skipjack, yellowfin, bonito and yellowtail. Whenever appearing hereinafter, the term "tuna" should be understood as including each of these types of fish.

The conventional tuna packing plant is usually located adjacent a dock suitable for unloading fish from a vessel. When the fish are unloaded from a vessel they are generally partially thawed. When the thawing process has been completed the fish are thereafter eviscerated. The eviscerated fish are placed in wire baskets and the baskets loaded onto wheeled racks. The loaded racks are thereafter moved into a metal, steam-receiving precooking oven. The precooking oven is usually of rectangular configuration and has a capacity of several racks. During the precooking operation the interior of these precooking ovens are maintained at a temperature generally varying between 212 and 220 degrees Fahrenheit and at superatmospheric pressure. At the conclusion of the precooking operation the racks are moved out of the precooking oven into a cooling room. This cooling room is usually open to the atmosphere and its temperature and humidity vary in accordance with atmospheric conditions. The fish remain in the cooling room until their temperature has been reduced to the point that they may undergo manual handling and are sufficiently firm that they may be cleaned. The cooling process usually requires from twelve to twenty-four hours. When the fish have been cooled to the desired temperature they are moved out of the cooling room and into the cleaning area of the plant. The fish cleaning operation requires manual labor and in cleaning a fish the head is removed and the skin and fins scraped off. The fish is then split and the backbone removed. Each half is split again longitudinally and the dark meat carefully scraped away. Four large longitudinal muscles called loins are then cut to can size and packed in the cans by hand or mechanical means.

The aforedescribed conventional method of preparing fish for canning gives rise to several disadvantages. During the lengthy period of time required to cool the fish after precooking, considerable browning of the meat takes place. This results in a dark pellicle. Since it is important that the meat to be canned is of a white or light color, such brown discoloration must be removed by skillful hand scraping. This scraping not only reduces the yield of usable meat but it additionally requires an added expenditure of labor. It has also been determined that the moisture content of the fish cannot be accurately controlled during the cooling period. Thus, the natural fish juices will undergo evaporative loss during this cooling period. Inasmuch as the temperature and humidity within the cooling room will change under varying atmospheric conditions, it is extremely difficult to schedule the fish in accordance with the needs of the cleaning and packing operations. It should be further noted that even under optimum conditions, the cooling room cannot be maintained truly sanitary. This is true since the fish juice will fall to the floor thereof and cannot readily be cleaned therefrom until the conclusion of the cooling period. Growth of mold on the walls and ceiling of the cooling room is also a common occurrence.

It is a major object of the present invention to eliminate each of the aforementioned disadvantages of the existing conventional method of preparing fish for canning.

Another object of the invention is to completely eliminate the necessity of providing a tuna plant with a cooling room. In existing plants such space can be readily converted to a productive use.

Yet another object is to provide a method of preparing fish for canning which may be conducted with existing equipment after effecting slight and comparatively inexpensive modification of such equipment.

An additional object is to provide a method of preparing fish for canning which requires much less time than existing methods.

A further object is to provide a method of preparing fish for canning which appreciably raises the yield of usable meat as compared to existing methods.

These and other objects and advantages of the present invention will become apparent from the following detailed description when taken in conjunction with the appended drawings wherein.

Figure 1:
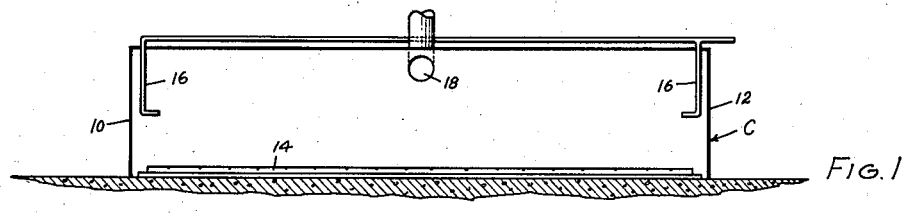
Figure 1 is a side view showing a precooking and cooling chamber which may be employed in carrying out the method of the present invention.

Referring to the drawings, the method of the present invention may be carried out in a combination precooking and cooling chamber C. This precooking and cooling chamber C is of generally rectangular configuration and includes a loading door 10 at its left-hand portion and an unloading door 12 at its right-hand portion. The interior of this chamber C is supplied with steam by conventional steam nozzles 14. These nozzles 14 are in communication with a suitable source of steam (not shown). The precooking and cooling chamber C is also provided with a plurality of moisture inlets 16. These moisture inlets 16 may be conventional fog nozzles having communication with a source of water under pressure (not shown). The interior of the precooking and cooling chamber is formed with one or more openings 18 having communication with a source of vacuum, such as a conventional vacuum pump or steam jet (not shown).

Figure 3:
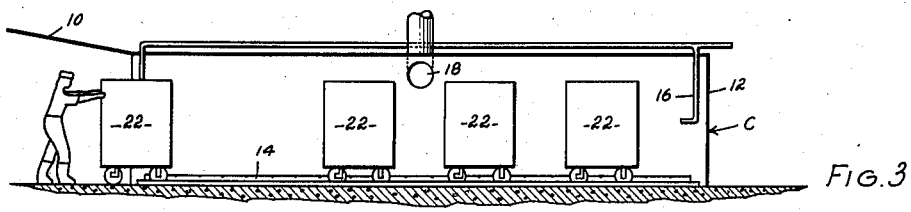
Figure 3 is a side view showing how said precooking and cooling chamber is loaded.
Figure 2:
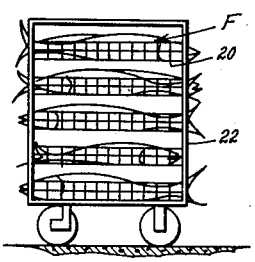
Figure 2 is an enlarged view showing the fish-holding baskets and racks employed in carrying out the method of the present invention.

Referring to Figures 2 and 3, the fish F to be prepared for canning are disposed within wire baskets 20 that are loaded upon wheeled racks 22. As indicated in this figure, the loaded racks 22 are moved into the precooking and cooling chamber C through the loading door 10, the unloading door 12 being closed. Thereafter, the loading door 10 is closed and with both doors shut the interior of the chamber C is substantially isolated with respect to the atmosphere.

Figure 4:
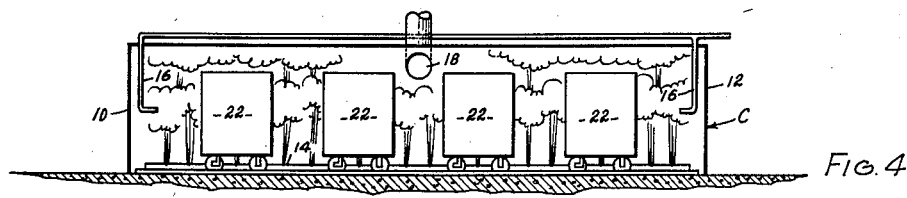
Figure 4 is a side view showing the precooking step.

Referring now to Figure 4, with the loading and unloading doors shut, steam is admitted to the chamber C through the nozzles 14. The admission of this steam raises the temperature within the chamber C to between 212 to 220 degrees Fahrenheit. The time required for this precooking step will vary in accordance with the size and quantity of the fish being processed. Generally, however, this time will vary from three to ten hours.

Figure 5:
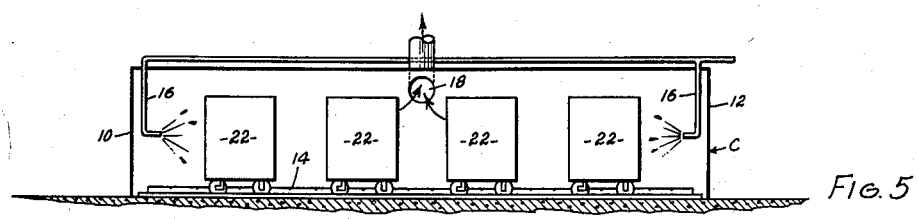
Figure 5 is a side view showing the cooling step of said method.

Referring now to Figure 5, at the conclusion of the precooking step the flow of steam into the precooking and cooling chamber C will be cut off. The interior of the chamber C will then be placed at subatmospheric pressure through communication with the source of vacuum by means of the opening 18. Accordingly, the moisture present within the fish will tend to undergo evaporation. In order to accurately control such evaporation solid moisture is forced into the chamber by means of the inlets 16. The evaporation of such moisture effects cooling of the space within the chamber C. During such cooling period the fish will remain substantially isolated from the atmosphere. It should be particularly observed that although the moisture inlets 16 are described as being of the water fog nozzle type, other means for introducing moisture within the chamber C may be employed without departing from the scope of the invention.

In practice, assuming the pressure within the oven approximates atmospheric at the beginning of the aforedescribed cooling period, it will progressively drop to approximately 0.5 p.s.i.a. at the end of such period. The temperature during this time will fall from approximately 218 degrees Fahrenheit to preferably a temperature of about 80 degrees Fahrenheit. The time required for this cooling generally lies between one to four hours. Preferably, the oven will be maintained free of air, with such air being completely replaced by steam or water vapor.

Figure 6:
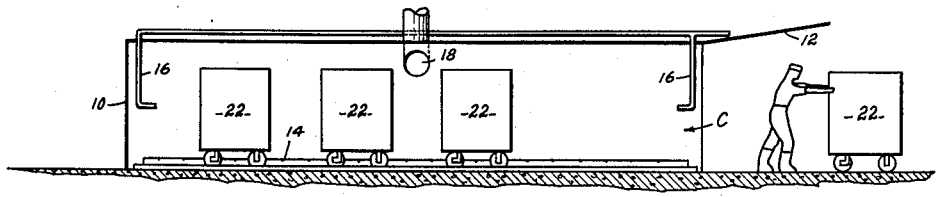
Figure 6 is a side view showing the manner in which said precooking and cooling chamber is unloaded.

Referring now to Figure 6, the cooling operation will continue until the temperature of the fish F has been reduced to the desired value. It will be apparent that the fish F can be cooled at a controlled rate inasmuch as the temperature within the chamber C can be varied as desired. Accordingly, the time at which the fish are to be removed from the precooking and cooling chamber can be adjusted to the schedule of the cleaning and packing personnel. When the fish F have been cooled to the desired temperature, the unloading door 12 is opened and the wheeled racks 22 are removed from the chamber C and transferred directly to the cleaning room. Alternately, the fish may be cooled to a temperature higher than that at which they are to be cleaned and held for subsequent cleaning.

It has been determined that the utilization of the aforedescribed method results in a considerable reduction in discoloration of the fish during the cooling period. This reduction in discoloration results primarily from the shortened period of time to which the fish must remain in contact with the atmosphere at high temperatures prior to the cleaning operation. Since the discoloring of the meat of the fish is maintained at a minimum, the percentage of yield is appreciably increased. Additionally, the costly hand scraping ordinarily required to remove such discolored pellicle is eliminated. Since the humidity within the precooking and cooling chamber C may be maintained at the desired magnitude by means of the moisture inlets 16, the natural fish juices will not be subject to evaporative losses during the cooling period. Additionally, incipient spoilage cannot occur since the cooling period is so short as compared to the lengthy cooling period required by existing methods of preparing fish for canning. It has also been determined that the fish loins will be considerably firmed as compared to the existing methods, and accordingly, the cleaning and packing operations are facilitated.

Although the aforedescribed method of the present invention has been described in connection with the preparation of tuna and tuna-like fish for canning, it will be apparent that it may also be applicable to the canning of other types of fish. It will likewise be apparent that various modifications and changes may be made with respect to the foregoing detailed description without departing from the spirit of the invention or the scope of the following claims.

This is a continuation-in-part of application Serial No. 649,363, filed March 29, 1957, and now abandoned.

We claim:

1. A method of cooling precooked tuna-like fish preparatory to canning which includes leaving said fish in the precooking zone that is substantially isolated from the atmosphere and filled with steam, placing said zone in communication with a source of vacuum to maintain said zone substantially air-free, and forcing solid moisture into said zone to maintain the humidity within said zone at a desired value while effecting cooling of the zone to a desired temperature.

2. A method of cooling precooked tuna-like fish preparatory to canning which includes leaving said fish in the precooking zone that is substantially isolated from the atmosphere and filled with steam at approximately atmospheric pressure, placing said zone in communication with a source of vacuum to maintain said zone substantially air-free, and forcing solid moisture into said zone to maintain the humidity within said zone at a desired value while effecting cooling of the zone to a temperature of approximately 80 degrees Fahrenheit and an approximate pressure of 0.5 p.s.i.a.

References Cited in the file of this patent

UNITED STATES PATENTS

| | | |
|---|---|---|
| 2,344,151 | Kasser | Mar. 14, 1944 |
| 2,493,586 | Lang | Jan. 3, 1950 |
| 2,634,590 | Beardsley | Apr. 14, 1953 |
| 2,708,636 | Rivoche | May 17, 1955 |
| 2,745,756 | Ruff | May 15, 1956 |
| 2,787,075 | Malecki | Mar. 12, 1957 |